(12) United States Patent
Jeong et al.

(10) Patent No.: US 11,613,244 B2
(45) Date of Patent: Mar. 28, 2023

(54) HYBRID ELECTRIC VEHICLE AND METHOD FOR COMPENSATING MOTOR TORQUE THEREOF

(71) Applicants: Hyundai Motor Company, Seoul (KR); Kia Motors Corporation, Seoul (KR)

(72) Inventors: Sang Hyun Jeong, Hwaseong-si (KR); Hae Seung Lee, Yongin-si (KR); Weon Jae Lee, Suwon-si (KR); Kyoung Joo Kim, Daejeon (KR); Yoon Sung Koo, Seoul (KR); Jung Hyun Lee, Yongin-si (KR); Young Chul Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 17/087,254

(22) Filed: Nov. 2, 2020

(65) Prior Publication Data

US 2021/0387610 A1    Dec. 16, 2021

(30) Foreign Application Priority Data

Jun. 12, 2020  (KR) .................. 10-2020-0071267

(51) Int. Cl.
*B60W 20/15*     (2016.01)
*B60W 10/08*     (2006.01)
(Continued)

(52) U.S. Cl.
CPC ............ *B60W 20/15* (2016.01); *B60K 6/38* (2013.01); *B60K 6/54* (2013.01); *B60K 23/00* (2013.01);
(Continued)

(58) Field of Classification Search
CPC ...... B60W 20/15; B60W 10/06; B60W 10/08; B60K 6/38; B60K 6/54; B60K 23/00;
(Continued)

(56) References Cited

U.S. PATENT DOCUMENTS

2012/0129649 A1* 5/2012 Kaltenbach ........... B60W 20/30
477/115
2016/0137188 A1* 5/2016 Zhu ...................... B60K 6/365
180/65.265
(Continued)

FOREIGN PATENT DOCUMENTS

DE     102018215047 A1 *  3/2020  ............ B60W 20/17
JP       2015142494 A  *  8/2015  ............ B60W 10/08

OTHER PUBLICATIONS

Machine translation for JP 2015142494 filed Sep. 9, 2022. (Year: 2022).*

*Primary Examiner* — Tisha D Lewis
(74) *Attorney, Agent, or Firm* — Morgan, Lewis & Bockius LLP (57) ABSTRACT

A hybrid electric vehicle and a method for compensating a motor torque thereof, may include a hybrid control unit (HCU) including a processor and a non-transitory storage medium containing instructions executed by the processor. The processor is configured to start motor torque intervention upon entering a predetermined shift phase during shifting, to determine a motor torque compensation amount by reflecting engine torque according to engine torque reduction control, and to perform motor torque compensation control based on the motor torque compensation amount.

16 Claims, 4 Drawing Sheets

(51) Int. Cl.
*B60K 6/38* (2007.10)
*B60K 6/54* (2007.10)
*B60K 23/00* (2006.01)
*B60W 10/06* (2006.01)
*B60L 15/20* (2006.01)

(52) U.S. Cl.
CPC ............. *B60L 15/20* (2013.01); *B60W 10/06* (2013.01); *B60W 10/08* (2013.01); *B60Y 2200/92* (2013.01); *B60Y 2300/43* (2013.01); *B60Y 2300/60* (2013.01)

(58) Field of Classification Search
CPC . B60L 15/20; B60Y 2200/92; B60Y 2300/43; B60Y 2300/60
See application file for complete search history.

(56) References Cited

U.S. PATENT DOCUMENTS

2017/0096069 A1* 4/2017 Cho ................. B60W 20/00
2018/0118184 A1* 5/2018 Ruybal ............. F16H 61/0059

\* cited by examiner

HYBRID ELECTRIC VEHICLE AND METHOD FOR COMPENSATING MOTOR TORQUE THEREOF

CROSS-REFERENCE TO RELATED APPLICATION

The present application claims priority to Korean Patent Application No. 10-2020-0071267, filed in the Korean Intellectual Property Office on Jun. 12, 2020, the entire contents of which is incorporated herein for all purposes by this reference.

BACKGROUND OF THE INVENTION

Field of the Invention

The present disclosure relates to a hybrid electric vehicle (HEV) equipped with an automated manual transmission (AMT) and a method for compensating a motor torque thereof.

Description of Related Art

A HEV refers to a vehicle using two or more types of different driving sources, and generally means a vehicle driven by an engine generating driving power through burning fuel and a motor generating driving power using electric energy of a battery. A P3-type AMT in which a motor is connected to the transmission output may be applied to the HEV.

In the case of the P3-type AMT, the shift delay and shift shock according to the disconnection of the engine torque (i.e., transmission input torque) may occur due to the disengagement of the single clutch of the transmission upon controlling the shift of the Transmission Control Unit (TCU), thereby providing a driver with discomfort such as the sense of difference in shifting.

The information disclosed in this Background of the Invention section is only for enhancement of understanding of the general background of the invention and may not be taken as an acknowledgement or any form of suggestion that this information forms the prior art already known to a person skilled in the art.

SUMMARY

Various aspects of the present invention are directed to providing a HEV that improves gear shift quality by compensating motor torque through controlling motor torque intervention upon disengaging the single clutch of the transmission, and a motor torque compensation method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a hybrid electric vehicle (HEV) includes a hybrid control unit (HCU) including a processor and a memory storing instructions executed by the processor. The processor is configured to start motor torque intervention upon entering a predetermined shift phase during shifting, to determine a motor torque compensation amount by reflecting engine torque according to engine torque reduction control, and to perform motor torque compensation control based on the motor torque compensation amount.

The predetermined shift phase is a section in which a clutch provided in a transmission of the HEV is released to shift a gear of the transmission.

The transmission is implemented with a P3-type automated manual transmission (AMT).

The HEV further includes a transmission control unit (TCU) for monitoring an operating state of the transmission. The TCU makes a request for engine torque reduction to an engine management system (EMS), when the transmission enters the predetermined shift phase after shifting is started.

The EMS reduces the engine torque according to a pre-stored engine torque reduction control map and transmits the reduced engine torque to the HCU.

The TCU makes a request for the motor torque intervention to the HCU after making the request for the engine torque reduction.

The processor determines the motor torque compensation amount based on the reduced engine torque according to a pre-stored motor torque intervention control map.

The motor torque intervention control map is a table in which a motor torque control amount and a motor torque control slope are defined for each shift phase and each engine torque with respect to each shift case.

The processor calculates a target motor torque by reflecting the motor torque compensation amount, and transmits the calculated target motor torque to a motor control unit (MCU) connected to the HCU.

The MCU controls a motor torque of a motor by adjusting a rotational speed of the motor based on the target motor torque and measures actual motor torque according to motor torque control to transmit the actual motor torque to the HCU.

According to an aspect of the present disclosure, a motor torque compensating method of a HEV includes starting, by a HCU, motor torque intervention upon entering a predetermined shift phase during shifting, determining, by the HCU, a motor torque compensation amount by reflecting engine torque according to engine torque reduction control, and performing, by the HCU, motor torque compensation control based on the motor torque compensation amount.

The predetermined shift phase is a section in which a clutch provided in a transmission of the HEV is released to shift a gear of the transmission.

The starting of the motor torque intervention includes determining, by a TCU, whether the transmission enters the predetermined shift phase, after shifting is started, and making, by the TCU, a request for engine torque reduction to an EMS when it is determined that the transmission enters the predetermined shift phase.

The starting of the motor torque intervention further includes making, by the TCU, a request for the motor torque intervention to the HCU after making the request for the engine torque reduction.

The determining of the motor torque compensation amount includes reducing, by the EMS, the engine torque based on an engine torque reduction control map, transmitting, by the EMS, the reduced engine torque to the HCU, and calculating, by the HCU, the motor torque compensation amount, using the reduced engine torque.

The calculating of the motor torque compensation amount includes calculating the motor torque compensation amount based on the reduced engine torque according to a pre-stored motor torque intervention control map.

The motor torque intervention control map is a table in which a motor torque control amount and a motor torque control slope are defined for each shift phase and each engine torque with respect to each shift case.

The performing of the motor torque compensation control includes calculating target motor torque by reflecting the motor torque compensation amount, transmitting the calculated target motor torque to a MCU, and controlling, by the MCU, motor torque by adjusting a rotational speed of a motor based on the target motor torque.

The performing of the motor torque compensation control further includes measuring, by the MCU, actual motor torque according to motor torque control to transmit the actual motor torque to the HCU.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Figure 1:
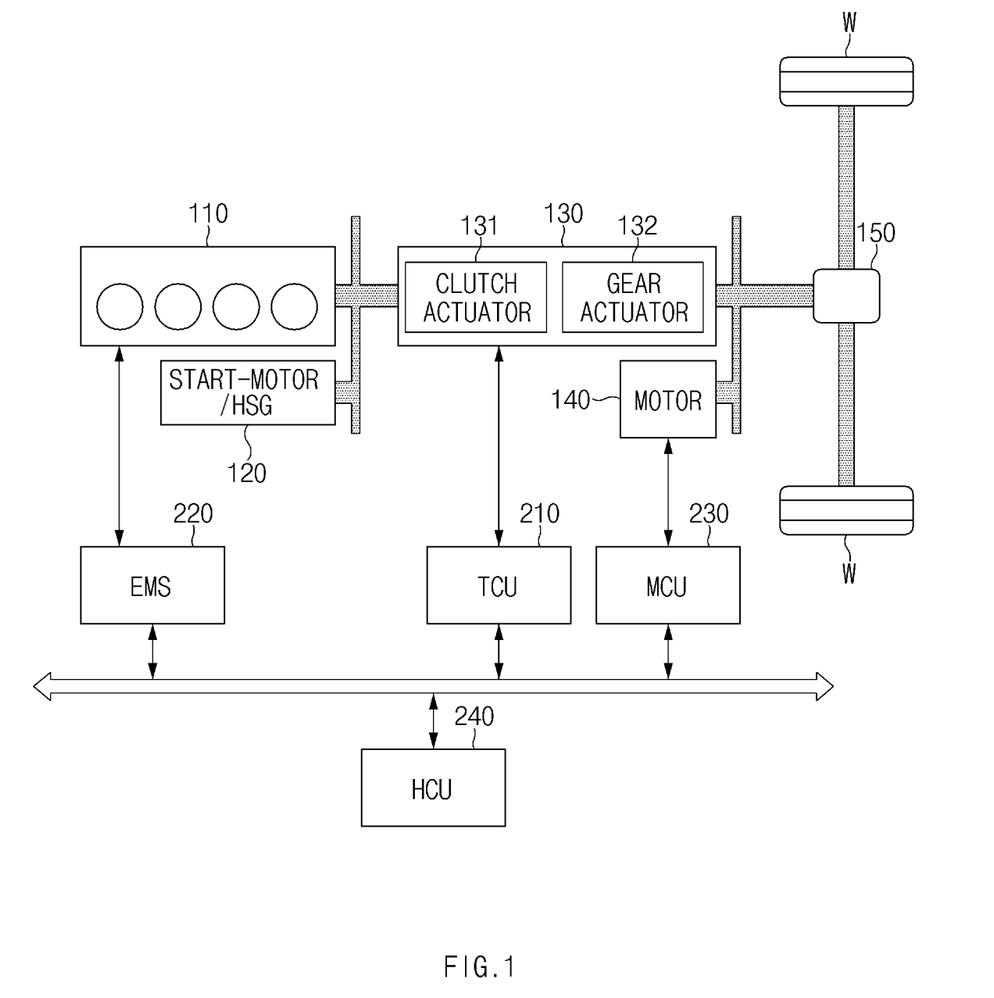
FIG. 1 is a block diagram of a HEV according to an embodiment of the present disclosure.

FIG. 1 is a block diagram of a HEV according to an embodiment of the present disclosure.

Referring to FIG. 1, a HEV (hereinafter referred to as a "vehicle") may refer to a vehicle equipped with a P3-type AMT, and may include an engine 110, a start motor or Hybrid Starter Generator (HSG) (hereinafter referred to as a "start-motor/HSG") 120, a transmission 130, a motor 140, a differential gear 150, a Transmission Control Unit (TCU) 210, an Engine Management System (EMS) 220, a Motor Control Unit (MCU) 230, and a Hybrid Control Unit (HCU) 240. The HCU 240 is connected to the TCU 210, the EMS 220, and the MCU 230 via a vehicle network. The vehicle network is implemented with Controller Area Network (CAN), a Media Oriented Systems Transport (MOST) network, Local Interconnect Network (LIN), Ethernet, and/or X-by-Wire (Flexray).

The engine 110 generates mechanical power, that is, torque, by burning fuel. Various engines known as a gasoline engine, a diesel engine, or the like may be used as the engine 110. The rotational power generated by the engine 110 is delivered to the side of the transmission 130.

The start-motor/HSG 120 may be mounted on the engine 110 and may start by cranking the engine 110. The start-motor/HSG 120 may generate electric energy by operating as a generator in a state where the engine 110 is started.

The transmission 130 is disposed at the output terminal of the engine 110 and converts and outputs the output torque of the engine 110 into a transmission ratio corresponding to the shifting gear. The transmission 130 includes a clutch actuator 131 and a gear actuator 132. The clutch actuator 131 manipulates a single clutch provided inside the body of the transmission 130. Under the control of the TCU 210, the clutch actuator 131 engages or disengages a clutch to deliver or block the output torque of the engine 110 to the transmission 130. The clutch actuator 131 disengages (detaches) the clutch during the shift period to block the power generated by the engine 110 from being delivered to the transmission 130. The gear actuator 132 manipulates a transmission to perform gear shifting. The gear actuator 132 allows the shifting to be performed by changing the engagement/disengagement states of shifting gears. The gear ratio is changed by the gear shifting of the gear actuator 132.

The motor 140 is disposed on the output side of the transmission 130 to generate the power necessary to drive wheels 'W'. The motor 140 may adjust the magnitude of the output torque generated under the control of the MCU 230. The motor 140 operates by receiving the power from a vehicle battery (e.g., a high voltage battery). A power converter may be interposed between the motor 140 and the vehicle battery. The power converter converts and supplies the voltage output from the vehicle battery into a motor driving voltage. The motor 140 operates as a generator in a regenerative braking mode to generate regenerative energy. The vehicle battery may be charged by the regenerative energy generated by the motor 140.

The differential gear 150 delivers the sum of the output torque of the transmission 130 and the output torque of the motor 140 as a driving torque to the wheels 'W'. The differential gear 150 distributes and delivers the power generated by the engine 110 and the motor 140 to both wheels 'W'.

The TCU 210 controls the overall operation of the transmission 130. The TCU 210 determines an optimal shifting gear based on information about a vehicle's driving speed (i.e., a vehicle speed or a wheel speed), accelerator pedal position, engine rotation speed, and/or clutch travel, through sensors in the vehicle. The TCU 210 may determine whether to start shifting by comparing the determined shifting gear with the current shifting gear of the vehicle. The TCU 210 may identify the current shifting gear of the vehicle through a sensor. The TCU 210 transmits shift information to the transmission 130 upon determining shift start. The shift information may include a shift start time point and/or a shift case (shift type). The transmission 130 controls the clutch actuator 131 and the gear actuator 132 based on shift information to perform a shift process (procedure).

The TCU 210 monitors the shifting progress state (operating state) of the transmission 130. The TCU 210 may determine whether the transmission 130 enters a predetermined shift phase when the transmission 130 starts shifting. Here, the shift phase refers to a subdivision of the shifting process depending on a clutch state, and may be divided into a clutch apply phase and a clutch release phase. The TCU 210 determines whether the transmission 130 enters the clutch release phase during the shift section when the shift is started.

The TCU 210 makes a request for engine torque reduction to the EMS 220 when the transmission 130 enters a predetermined shift phase, that is, a clutch release phase. In the case of AMT to which a single clutch is applied, gear shift is possible only when the clutch is released, and thus the engine torque reduction control for clutch release needs to be performed. The TCU 210 may make a request for motor torque intervention to the HCU 240 upon making a request for the engine torque reduction. The TCU 210 may transmit shift progress information to the HCU 240. The shift progress information may include information such as a shift phase, a clutch state, and/or a gear engagement state.

When the gear shift is completed, the TCU 210 requests the EMS 220 to stop the engine torque reduction control, and interrupts the engine torque intervention. Besides, the TCU 210 requests the HCU 240 to stop the motor torque intervention. The TCU 210 terminates a predetermined shift phase when receiving a notification that the motor torque intervention is terminated, from the HCU 240. In other words, the TCU 210 ends the shift by allowing the transmission 130 to exit the clutch release phase and to enter the clutch apply phase.

The EMS 220 controls the overall operation of the engine 110. The EMS 220 may control the rotational speed and/or output torque of the engine 110. The EMS 220 performs engine torque reduction control depending on the engine torque reduction request of the TCU 210. The EMS 220 may reduce the engine torque (output torque) by reducing the amount of air supplied to the engine with reference to the engine torque reduction control map stored in a memory (not illustrated). Herein, the engine torque reduction control map may include information about engine torque reduction amount (% or Nm) and engine torque reduction slope (%/s or Nm/s) for each shift phase associated with each shift case.

The EMS 220 transmits target engine torque and/or actual engine torque to the HCU 240. The target engine torque may be received from the TCU 210 or may be determined by the EMS 220. The actual engine torque may be calculated using the engine rotation speed measured by a sensor.

The MCU 230 controls the output torque of the motor 140 depending on the instruction (command) of the HCU 240. In other words, the MCU 230 receives the target motor torque as the command from the HCU 240 and controls the rotation speed of the motor 140 depending on the received command. The MCU 230 may measure the rotation speed of the motor 140 using a sensor and may calculate the actual motor torque using the measured rotation speed. The MCU 230 transmits the calculated actual motor torque to the HCU 240.

The HCU 240 controls the overall driving of the vehicle. When the HCU 240 receives a motor torque intervention request from the TCU 210, the HCU 240 performs motor torque intervention control through the MCU 230. The HCU 240 determines the amount of motor torque intervention (i.e., the amount of motor torque compensation) based on the actual engine torque provided from the EMS 220. Here, the actual engine torque refers to the engine torque reduced by the engine torque reduction control. The HCU 240 may determine the amount of motor torque intervention with reference to the motor torque intervention control map stored in the memory based on the reduced engine torque. As illustrated in Table 1, the motor torque intervention control map may include information about the motor torque control amount (intervention amount, % or Nm) and the motor torque control slope (%/s or Nm/s) for each shift phase for each shift case and for each engine torque (transmission input torque).

TABLE 1

| Shift case | Motor torque intervention control map | Note |
|---|---|---|
| 1→2<br>2→3<br>3→4<br>4→5<br>2→1<br>3→2<br>4→3<br>5→4 | [Motor torque slope control map]<br>X-axis: Shift phase index (0~12)<br>Y-axis: Transmission input (engine torque (Nm)<br>Z-axis: Motor torque control slope (%/s or Nm/s)<br>☐-100%/s~+100%/s (resolution: 0.1%/s)<br>☐-1200 Nm/s~+1200 Nm/s (resolution: 0.1 Nm/s)<br>Offset Delay time: 0~2550 ms (resolution: 1 ms)<br>[Motor torque amount control map]<br>X-axis: Shift phase (0~12)<br>Y-axis: Transmission input (engine torque (Nm)<br>Z-axis: Motor torque control amount (% or Nm)<br>☐-100%~+100% (resolution: 0.1%)<br>☐-1200 Nm~+1200 Nm (resolution: 0.1 Nm)<br>Offset Delay time: 0~2550 ms (resolution: 1 ms) | Slope where differentiation of intervention amount is possible for each shift case (%/s, Nm/s)-<br>Intervention amount (Nm, %) |

The HCU 240 determines the target motor torque by reflecting the amount of motor torque intervention, and transmits the determined target motor torque to the MCU 230. When receiving a request for stopping the motor torque intervention from the TCU 210, the HCU 240 interrupts controlling the motor torque intervention. The HCU 240 requests the MCU 230 to stop controlling the motor torque. Each of the controllers 210, 220, 230 and 240 may include at least one processor, memory and network interface. The processor may be a semiconductor device processing instructions stored in the memory. The processor may be implemented with an Application Specific Integrated Circuit (ASIC), a Digital Signal Processor (DSP), a Programmable Logic Devices (PLD), Field Programmable Gate Arrays (FPGAs), a Central Processing Unit (CPU), micro-controllers, and/or microprocessors. The memory may include various types of volatile or nonvolatile storage media. For example, the memory may include storage media (recording media), such as a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a cache, and/or a removable disc.

Figure 2:
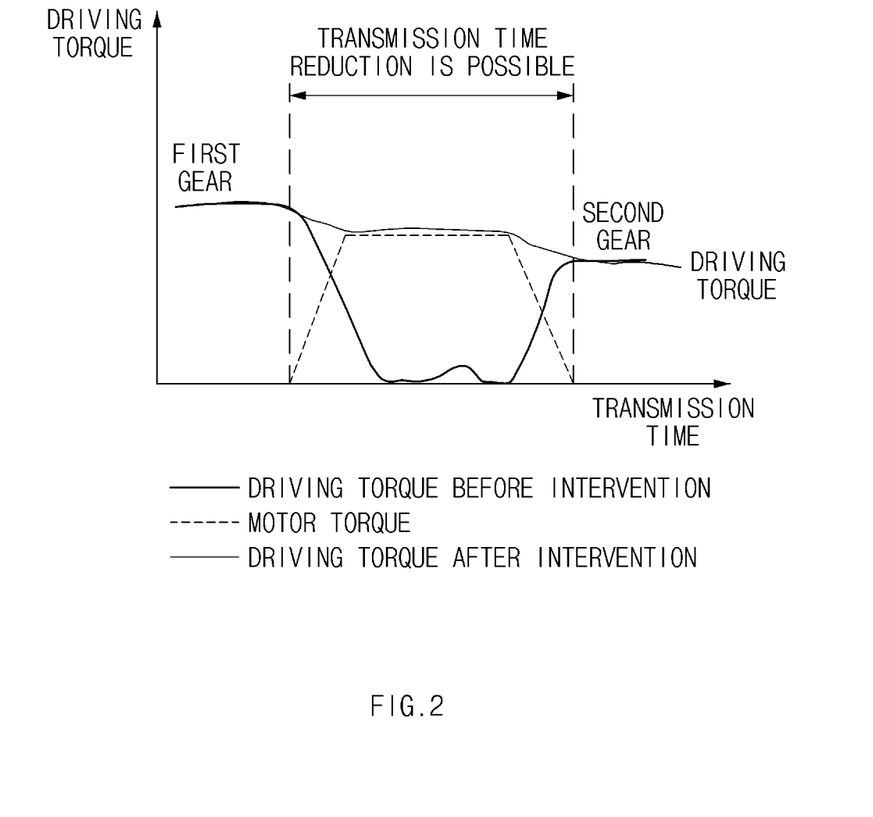
FIG. 2 is a graph illustrating a change in driving torque according to motor torque intervention according to an embodiment of the present disclosure.

FIG. 2 is a graph illustrating a change in driving torque according to motor torque intervention according to an embodiment of the present disclosure.

Referring to FIG. 2, when motor torque intervention is not performed during shifting, the input torque (i.e., the output torque (engine torque) of the engine 110) of the transmission 130 is cut off, and thus the large variation in driving torque transmitted to the wheel occurs. Shifting delays and the phenomena of wobble occur due to the variation in driving torque during shifting.

As disclosed in this specification, when the single clutch of the transmission 130 is released, the motor torque is compensated based on the engine torque, which is the input torque of the transmission 130 disconnected through motor torque intervention control, thereby improving the sense of difference in shifting and shortening a shift time by reducing the variation in driving torque.

Figure 3A:
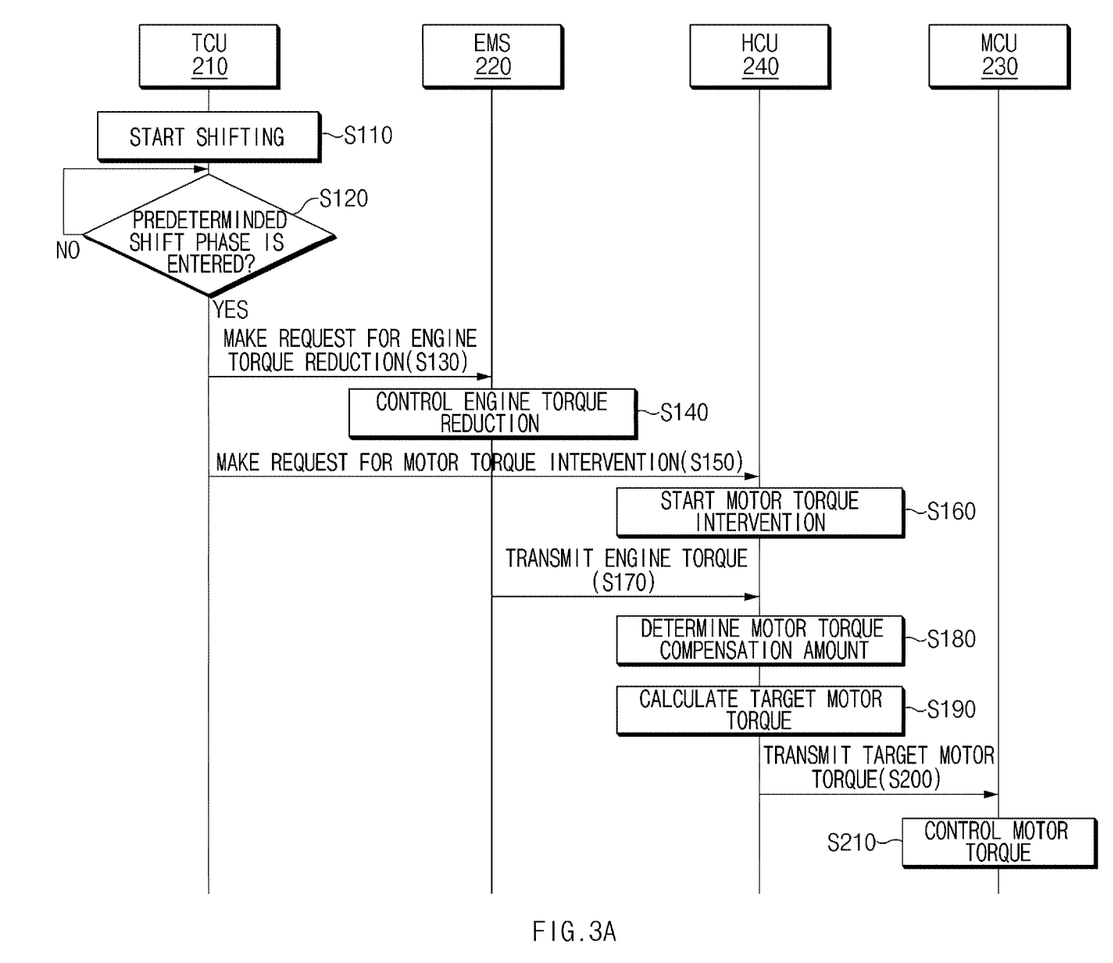
FIGS. 3A and 3B are flowcharts illustrating a motor torque compensating method of HEV according to an embodiment of the present disclosure.
Figure 3B:
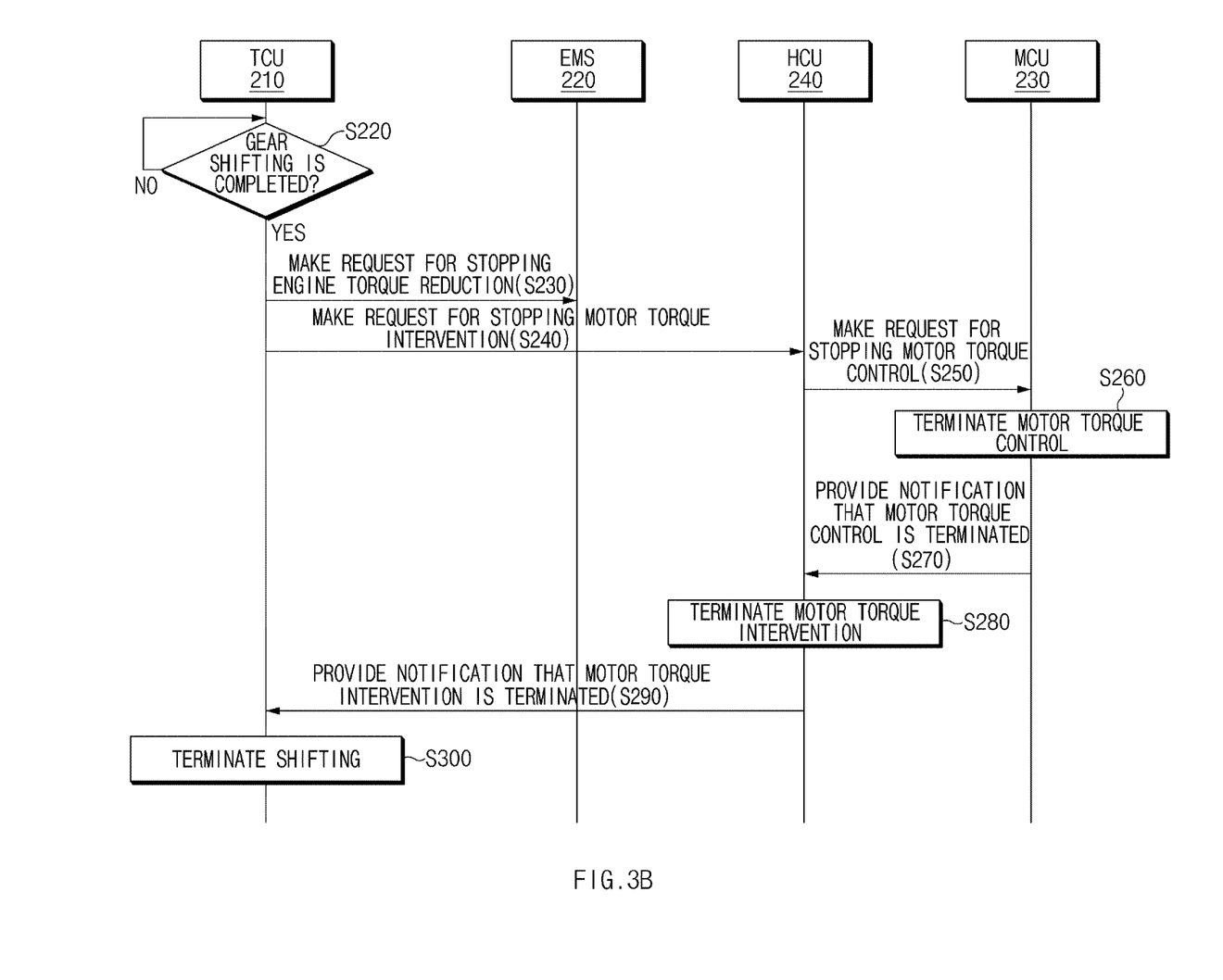

FIGS. 3A and 3B are flowcharts illustrating a motor torque compensating method of HEV according to an embodiment of the present disclosure.

The TCU 210 recognizes the start of shifting through monitoring the operating state of the transmission 130 (S110).

When the shift is started, the TCU 210 determines whether the transmission 130 enters a predetermined shift phase (S120). Herein, a predetermined shift phase refers to a clutch release phase. The TCU 210 determines whether a shift progress state of the transmission 130 after shift start is a clutch release phase.

When the transmission 130 enters the predetermined shift phase, the TCU 210 makes a request for the engine torque reduction to the EMS 220 (S130). In other words, when the shift progress state is a predetermined shift phase, the TCU 210 makes a request for engine torque intervention to the EMS 220.

The EMS 220 controls engine torque reduction at the request of the TCU 210 (S140). The EMS 220 starts engine torque intervention at the request of the TCU 210. The EMS 220 may control the engine torque with reference to the pre-stored engine torque reduction control map. The EMS 220 may reduce the engine torque by reducing the amount of air supplied to an engine based on an engine torque reduction control map. When the engine torque reduction control of the EMS 220 is started, the transmission 130 may proceed to actual shifting.

The TCU 210 makes a request for motor torque intervention to the HCU 240 (S150). The TCU 210 may make a request for the motor torque intervention to the HCU 240 when receiving a response to the engine torque reduction request, that is, a notification that the engine torque reduction control is started, from the EMS 220.

The HCU 240 starts the motor torque intervention at the request of the TCU 210 (S160).

The HCU 240 receives engine torque from the EMS 220 upon starting the motor torque intervention (S170). The EMS 220 may transmit target engine torque and/or actual engine torque to the HCU 240. The EMS 220 may transmit the engine torque reduced by the engine torque reduction control to the HCU 240.

The HCU 240 determines a motor torque compensation amount (intervention amount) based on the engine torque received from the EMS 220 (S180). The HCU 240 may determine the motor torque compensation amount with reference to the pre-stored motor torque intervention control map based on the engine torque reduced by the engine torque reduction control. The motor torque intervention control map is a table in which the motor torque control amount and the motor torque control slope are defined for each shift phase and each engine torque with respect to each shift case.

When the motor torque compensation amount is determined, the HCU 240 calculates the target motor torque by reflecting the corresponding amount of motor torque compensation (S190). The HCU 240 may compensate for the motor torque by the engine torque disconnected due to the clutch release of the transmission 130.

The HCU 240 transmits the target motor torque to the MCU 230 (S200).

The MCU 230 controls the motor torque of the motor 140 based on the target motor torque (S210). The MCU 230 may control the output torque (motor torque) of the motor 140 by adjusting the rotation speed of the motor 140. The MCU 230 may measure actual motor torque through a sensor and may transmit the actual motor torque to the HCU 240.

The TCU 210 determines whether gear shifting is completed (S220). In other words, the TCU 210 determines whether the transmission 130 enters the actual shifting termination, that is, a clutch apply phase.

The TCU 210 requests the EMS 220 to stop engine torque reduction when gear shifting is completed (S230). The EMS 220 may stop the engine torque reduction control at the request of the TCU 210 and may transmit, to the TCU 210, a notification (signal) that the engine torque reduction is stopped.

Next, the TCU 210 requests the HCU 240 to stop the motor torque intervention (S240). The HCU 240 starts a procedure of stopping motor torque intervention at the request of the TCU 210.

The HCU 240 requests the MCU 230 to stop the motor torque control (S250). The HCU 240 requests the MCU 230 to stop the motor torque compensation control.

The MCU 230 terminates the motor torque control depending on the instruction of the HCU 240 (S260). That is, the MCU 230 interrupts motor torque compensation. The MCU 230 notifies the HCU 240 that the motor torque control is terminated (S270).

When the motor torque control of the MCU 230 is terminated, the HCU 240 terminates the motor torque intervention (S280). When the motor torque control is stopped, the HCU 240 may interrupt the motor torque compensation control. The HCU 240 notifies the TCU 210 that the motor torque intervention is terminated (S290).

When the motor torque intervention of the HCU 240 is terminated, the TCU 210 terminates shifting (S300). When the motor torque intervention is terminated, the TCU 210 terminates the torque intervention (clutch release phase) and enters the clutch apply phase to terminate shifting.

According to embodiments, the shift delay and wobble according to engine torque disconnection during shifting may be improved through motor torque compensation control (motor torque intervention control). Furthermore, it is possible to reduce and compensate the sense of torque disconnection by subdividing the starting time point of torque for each shift phase, the rising slope of torque, a state where torque is maintained, and the like.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, it is possible to compensate motor torque through controlling motor torque intervention upon disengaging the single clutch of the transmission, thereby minimizing the sense of torque disconnection in shifting to improve the sense of difference in shifting and to shorten the shift time.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid electric vehicle (HEV) comprising:
   a hybrid control unit (HCU) including a processor and a non-transitory storage medium containing instructions executed by the processor,
   wherein the processor is configured to:
      start motor torque intervention upon entering a predetermined shift phase during shifting;
      determine a motor torque compensation amount by reflecting engine torque according to engine torque reduction control; and
      perform motor torque compensation control based on the motor torque compensation amount,
   wherein the processor determines the motor torque compensation amount according to a pre-stored motor torque intervention control map, and
   wherein the motor torque intervention control map is a table in which a motor torque control amount and a motor torque control slope are defined for each shift phase and each engine torque with respect to each shift case.

2. The HEV of claim 1, wherein the predetermined shift phase is a section in which a clutch provided in a transmission of the HEV is released to shift a gear of the transmission.

3. The HEV of claim 2, wherein the transmission is implemented with an automated manual transmission in which a motor is connected to an output of the transmission.

4. The HEV of claim 2, further comprising:
   a transmission control unit (TCU) connected to the HCU and configured to monitor an operating state of the transmission,
   wherein the TCU makes a request for engine torque reduction to an engine management system (EMS) connected to the TCU, when the transmission enters the predetermined shift phase after the shifting is started.

5. The HEV of claim 4, wherein the EMS reduces the engine torque according to a pre-stored engine torque reduction control map and transmits the reduced engine torque to the HCU connected to the EMS.

6. The HEV of claim 5, wherein the TCU makes a request for the motor torque intervention to the HCU after making the request for the engine torque reduction.

7. The HEV of claim 6, wherein the processor calculates a target motor torque by reflecting the motor torque compensation amount, and transmits the calculated target motor torque to a motor control unit (MCU) connected to the HCU.

8. The HEV of claim 7, wherein the MCU controls a motor torque of a motor by adjusting a rotational speed of the motor based on the target motor torque and measures actual motor torque according to motor torque control to transmit the actual motor torque to the HCU.

9. A motor torque compensating method of a hybrid electric vehicle (HEV), the method comprising:
   starting, by a hybrid control unit (HCU), motor torque intervention upon entering a predetermined shift phase during shifting;
   determining, by the HCU, a motor torque compensation amount by reflecting engine torque according to engine torque reduction control; and
   performing, by the HCU, motor torque compensation control based on the motor torque compensation amount,
   wherein the determining of the motor torque compensation amount includes determining the motor torque compensation amount according to a pre-stored motor torque intervention control map, and
   wherein the motor torque intervention control map is a table in which a motor torque control amount and a motor torque control slope are defined for each shift phase and each engine torque with respect to each shift case.

10. The method of claim 9, wherein the predetermined shift phase is a section in which a clutch provided in a transmission of the HEV is released to shift a gear of the transmission.

11. The method of claim 10, wherein the starting of the motor torque intervention includes:
    determining, by a transmission control unit (TCU) connected to the HCU, whether the transmission enters the predetermined shift phase, after the shifting is started; and
    making, by the TCU, a request for engine torque reduction to an engine management system (EMS) connected to an engine and the HCU of the HEV when the TCU concludes that the transmission enters the predetermined shift phase.

12. The method of claim 11, wherein the starting of the motor torque intervention further includes:

making, by the TCU, a request for the motor torque intervention to the HCU after making the request for the engine torque reduction.

13. The method of claim 12, wherein the determining of the motor torque compensation amount includes:

reducing, by the EMS, the engine torque based on an engine torque reduction control map;

transmitting, by the EMS, the reduced engine torque to the HCU; and calculating, by the HCU, the motor torque compensation amount, using the reduced engine torque.

14. The method of claim 13, wherein the performing of the motor torque compensation control includes:

calculating target motor torque by reflecting the motor torque compensation amount;

transmitting the calculated target motor torque to a motor control unit (MCU) connected to a motor of the HEV and HCU; and controlling, by the MCU, a motor torque of the motor by adjusting a rotational speed of the motor based on the target motor torque.

15. The method of claim 14, wherein the performing of the motor torque compensation control further includes:

measuring, by the MCU, actual motor torque according to motor torque control to transmit the actual motor torque to the HCU.

16. The method of claim 10, wherein the transmission is implemented with automated manual transmission in which a motor is connected to an output of the transmission.

* * * * *